US006556384B1

United States Patent
Inoue et al.

(10) Patent No.: US 6,556,384 B1
(45) Date of Patent: Apr. 29, 2003

(54) HEAD SUPPORTING ARM, DATA RECORDING APPARATUS, WITH LASER BEAM EXPOSING APERTURE AND LIMITER

(75) Inventors: Hiroo Inoue, Fujisawa (JP); Tatsushi Yoshida, Chigasaki (JP); Tatsumi Tsuchiya, Ayase (JP); Yurika Shimozawa, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/590,659

(22) Filed: Jun. 7, 2000

(30) Foreign Application Priority Data

Jun. 7, 1999 (JP) .......................................... 11-159168

(51) Int. Cl.$^7$ ............................. G11B 21/24; G11B 5/48
(52) U.S. Cl. .............................. 360/245.7; 360/234.6; 360/245.3
(58) Field of Search .......................... 360/245.7, 245.4, 360/245.3, 245.2, 245, 234.6

(56) References Cited

U.S. PATENT DOCUMENTS

| | | | | |
|---|---|---|---|---|
| 5,333,085 A | * | 7/1994 | Prentice et al. | 360/245.7 |
| 5,771,136 A | * | 6/1998 | Girard | 360/245.7 |
| 5,838,517 A | | 11/1998 | Frater et al. | 360/104 |
| 5,877,920 A | * | 3/1999 | Resh | 360/245.7 |
| 5,986,853 A | * | 11/1999 | Simmons et al. | 360/245.9 |
| 6,055,132 A | * | 4/2000 | Arya et al. | 360/245.9 |
| 6,067,209 A | * | 5/2000 | Aoyagi et al. | 360/245.7 |
| 6,172,853 B1 | * | 1/2001 | Davis et al. | 360/245.7 |
| 6,191,915 B1 | * | 2/2001 | Takagi et al. | 360/245.7 |
| 6,226,154 B1 | * | 5/2001 | Albrecht | 360/254.7 |
| 6,243,235 B1 | * | 6/2001 | Fu et al. | 360/234.5 |
| 6,320,729 B1 | * | 11/2001 | Coon | 360/245.7 |
| 6,366,431 B1 | * | 4/2002 | Tsuchiya et al. | 360/245 |

FOREIGN PATENT DOCUMENTS

EP        0 351 837 A2     7/1989

* cited by examiner

Primary Examiner—Brian E. Miller
(74) Attorney, Agent, or Firm—Kunzler & Associates

(57) ABSTRACT

The present invention provides a head supporting arm that allows for laser tacking while having a merging lip and limiters for loading/unloading respectively. A head supporting arm according to the present invention includes a load beam, and a flexure connecting the load beam to a slider. The load beam having a dimple for generating a gimbal motion between the flexure and the slider. The slider having a head connected to its one end. The head supporting arm of the present invention further including an exposure opening formed in the load beam. The exposure opening allowing for the exposing of the bonding portion of the flexure that is bonded to the other end of the slider. The exposure opening further providing an opening to extend the limiters formed unitarily with the flexure 36 onto a surface of the load beam that is opposite to the surface on which the flexure 36 is provided. The extended limiters are hooked to the load beam at the opposite surface.

5 Claims, 3 Drawing Sheets

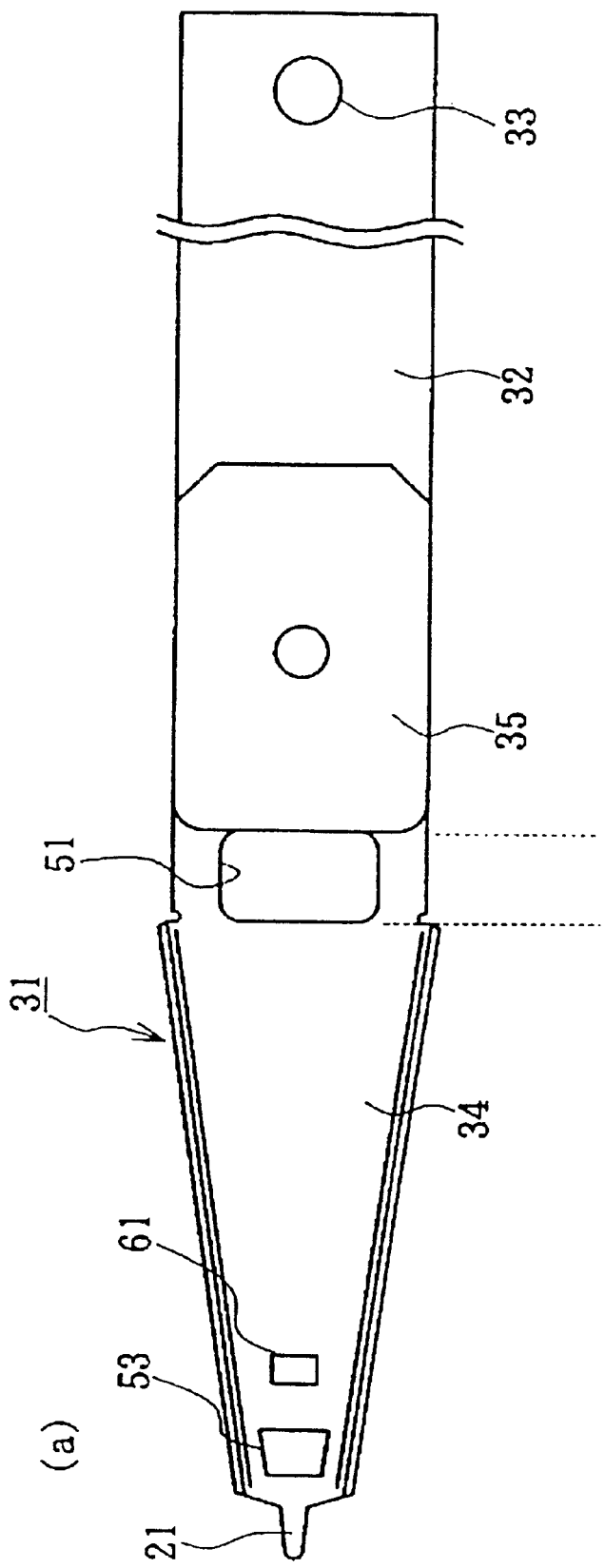
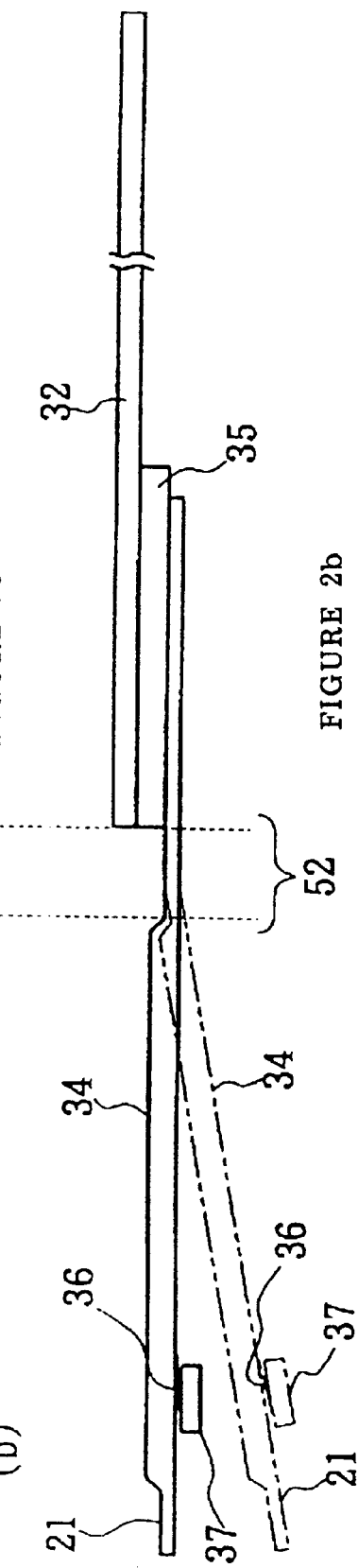
FIGURE 2a
FIGURE 2b

HEAD SUPPORTING ARM, DATA RECORDING APPARATUS, WITH LASER BEAM EXPOSING APERTURE AND LIMITER

TECHNICAL FIELD

The present invention relates in general to data recording technology, such as disk drive technology. In particular, the present invention relates to disk drives and a head supporting arm used in the disk drives and the method for manufacturing the head supporting arm.

BACKGROUND OF THE INVENTION

Conventional head supporting arms include a load beam, a slider including a head or a transducer on its one end, and a flexure including a connecting portion connected to the load beam and a bonding portion bonded to the slider by an adhesive agent. The load beam includes a dimple for generating a gimbal motion between the flexure and the slider. The arms support read/write heads in the hard disk drives.

With the advancement in the media technology, the currently available media are capable of holding a much larger amount of information. With the emergence of high density recording media, new types of recording heads, such as MR and GMR heads, were used to be able to take advantage of the higher capacity of the recording media. The MR and GMR recording heads are more sensitive and easily affected by static electricity and heat. Slider technology is reaching its limits as far as the flying height is concerned. Thus, it should be considered that deformation of the slider occurs due to a bimetal effect between the slider which is made of ceramic and the flexure which is made of stainless steel as thermal changes occurs.

To avoid the above-mentioned problems, an adhesive agent such as thermosetting resin is often used to connect the flexure to the slider. This type of adhesive agents cause less thermal changes after being cured, when using such a thermosetting resin for connecting the flexure to the slider, initially a laser beam is irradiated only at thermosetting resin on for a short period, thereby tacking the flexure to the slider temporarily (laser tacking). This initial step improves the efficiency in the production process. After the initial step, the whole head supporting arm to which both flexure and slider are fixed is heated by placing the assembly in an oven. This last step causes the thermosetting resin to be cured.

PROBLEMS TO BE SOLVED BY THE INVENTION

Typically, the above described laser tacking process can be used to bond the flexure and the slider in head assemblies that include contact start stop (CSS) type head supporting arms. CSS head supporting arms do not require a merging lip for loading/unloading at the tip of the head supporting arm. However, where the head assembly includes head supporting arms that require a merging lip for loading/unloading, respectively, the above laser tacking process can not be used efficiently. The head assembly includes head supporting arms that require a merging lip for loading/unloading are used in many cases in recent years. This is because the flexure is almost covered by the load beam in these type of arms.

The co-assigned Japanese Patent Application No. 10-370272, discloses a revised technique for enabling a laser tacking process for the head supporting arm having a merging lip for loading/unloading. The revised process disclosed by the Japanese Patent Application No. 10-370272 provides the load beam with an exposure opening for exposing the bonding portion of the flexure to which the slider is to be bonded. Thereafter, the laser beam is irradiated at the bonding portion of the flexure through this exposure opening. However, the technique disclosed in Japanese Patent Application No. 10-370272 can not be efficiently used where the head assembly includes a head supporting arm. The head supporting arm is often employed in the head assemblies and requires the load beam to have an opening used by a limiter that prevents the slider from sliding away too far from the load beam when the head is unloaded from a data recording medium.

It is an object of the present invention to provide a head supporting that enables laser tacking while having a merging lip and a limiter for loading/unloading of the head, as well as a method for manufacturing of the head supporting arm and a data recording apparatus.

SUMMARY OF THE INVENTION

The head supporting arm of the present invention comprises a load beam, a flexure including a connecting portion connected to the load beam and a bonding portion, and a slider having a head on its one end and bonded to the bonding portion by an adhesive agent, wherein the load beam has a dimple for generating a gimbal motion between the flexure and the slider. In this head supporting arm, (1) the load beam is provided with an exposure opening for exposing the bonding portion of the flexure bonded at the other end, which is opposite to the one end having the head of the slider, and (2) the limiter formed unitarily with the flexure is extended onto a surface of the exposure opening, which is at the opposite side of a surface where the flexure exists so that the limiter is hooked on the load beam.

The head supporting arm of the present invention enables the exposure opening to be used also as an opening of the limiter for loading/unloading the head, so that the limiter is hooked on the exposure opening. The exposure opening is originally used only for temporarily setting an adhesive made of a thermosetting resin for bonding the flexure and the slider together. Consequently, the laser beam can be irradiated for laser tacking while both merging lip and limiter for loading/unloading the head are present. In addition, because the laser beam irradiation point is positioned away from elements that are affected by the heat, such as a GMR head, the laser beam will not heat such elements. The head supporting arm can thus be configured in simple configuration. In addition, such a configuration of the exposure opening of the present invention would make it possible to eliminate fragile parts from the load beam.

In a preferred embodiment of the head supporting arm of the present invention, the exposure opening is shaped almost like a square, with length of each side of the opening being larger than the bonding portion of the flexure. The limiter is hooked to the load beam on one side of the exposure opening, which is away further from the dimple. In any of the above cases, it is possible to realize a preferred exposure opening that can be used as both the opening for irradiating the laser beam and the opening of the limiter.

In accordance with the present invention, the method for manufacturing the head supporting arm of the present invention includes the following steps: At first, the slider, which is to be put together with the flexure via a thermosetting resin therebetween with respect to the load beam while the limiter of the flexure is hooked on the exposure opening of the load beam, is disposed on the bonding portion. Then, a laser beam is irradiated on the part of the bonding portion from which the flexure is exposed through the opening, thereby causing the adhesive to set so that the flexure and the slider are held together temporarily. Thereafter, the head supporting arm to which both flexure and slider are fixed temporarily is heated in an oven so as to further cure the thermosetting resin. The flexure and the slider are thus bonded together adhesively. According to the manufacturing method described above, the head supporting arm provided with a merging lip and a limiter for loading/unloading respectively can be manufactured at a high yield.

Furthermore, the data recording apparatus of the present invention comprises a data recording medium for recording data and a head supporting arm composed as described above and moved relatively to the data recording medium.

BRIEF DESCRIPTION OF THE DRAWINGS

FIGS. 2(a) and 2(b) are top and side views of the head supporting arm in an embodiment of the present invention.

DETAILED DESCRIPTION OF THE INVENTION

Figure 1:
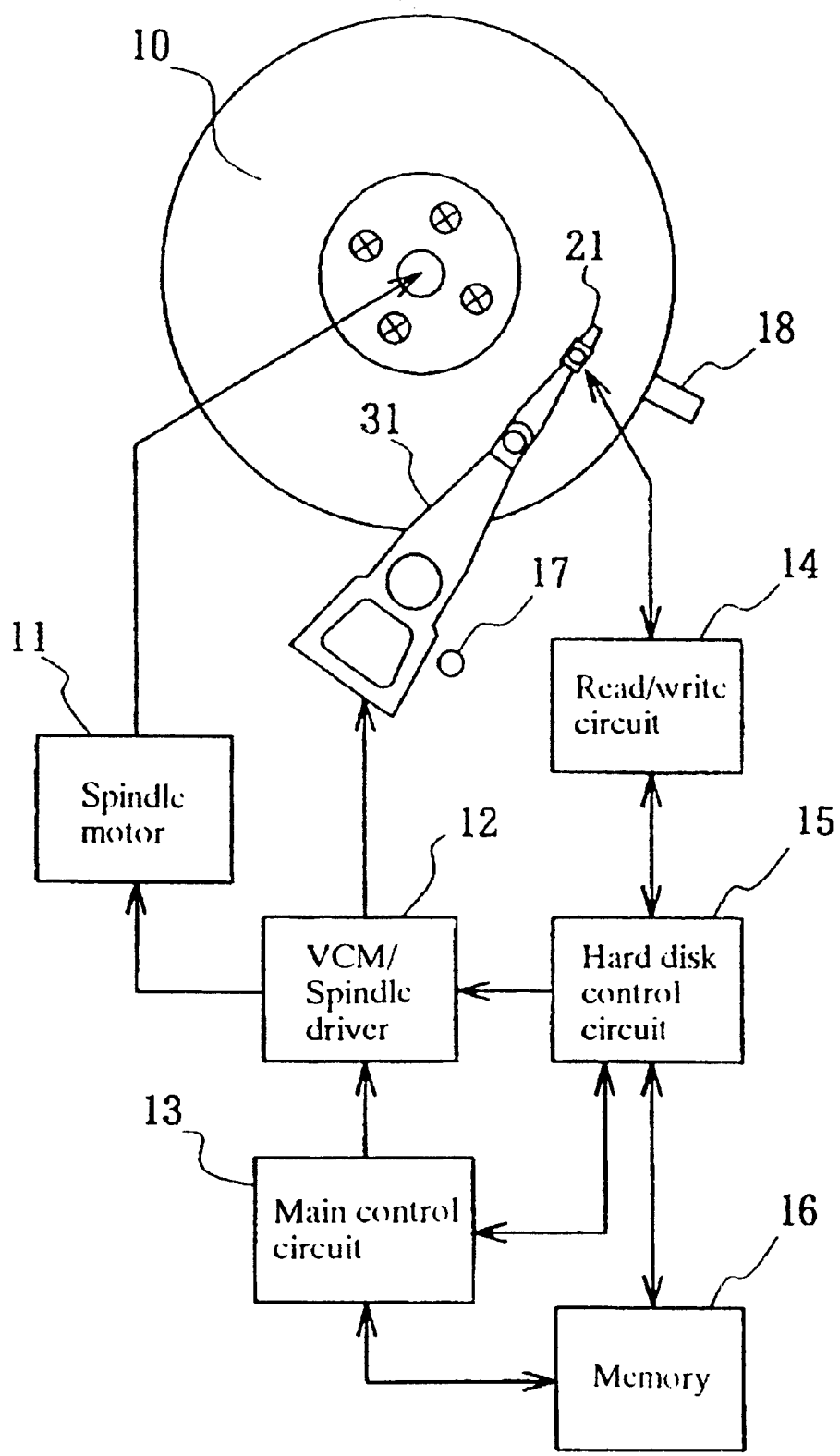
FIG. 1 is a circuit block diagram of an HDD unit including a head supporting arm manufactured according to the present invention.

FIG. 1 is a block diagram of a hard disk drive (HDD) unit that includes a head supporting arm 31 manufactured according to the present invention. The hard drive of FIG. 1 also includes a spindle motor 11 for rotating a magnetic data recording hard disk 10, a voice coil motor (VCM) that is controlled by a VCM/spindle driver 12, a read/write circuit 14 that is coupled to a hard disk control circuit 15, a memory 16 for recording data and control data, and the main control circuit or MPU 13. The control circuit 15 is also coupled to the VCM/spindle driver 12 and the memory 16. The MPU 13 controls the VCM/spindle driver 12, the hard disk control circuit 15, and the memory 16. The read/write head is attached to the slider (not illustrated). The slider is attached to the tip of the head supporting arm 31. The rear portion of the head supporting arm 31 is rotatably connected to the frame of the hard disk drive unit.

The HDD of the FIG. 1 further includes an inner crash stopper 17 that is mounted on the frame so as to be hooked to the head supporting arm 31. It is used to position the read/write head (not shown) on the innermost data recording track on the recording medium. The HDD further includes a ramp element 18 that is connected to its frame. In operation, the HDD unit is loaded in and unloaded from the data recording apparatus. While the HDD unit is in a stand by mode, the merging lip 21 provided at the tip of the head supporting arm 31 rests on the ramp element 18. During a read/write operation, the head supporting arm 31, is positioned towards the center of the hard disk 10, thereby the merging lip 21 leaves the ramp element 18. Hence, the slider and the read/write head fly above the disk respectively.

One embodiment of the head supporting arm 31 of the present invention is illustrated in FIGS. 2(a) and 2(b). FIG. 2(a) is a top view and FIG. 2(b) is a side view of the head supporting arm 31. Referring to FIGS. 2(a) and 2(b), the head supporting arm 31 comprises an actuator arm 32, a load beam 34, a mount plate 35 for connecting the load beam 34 to the actuator arm 32, a flexure 36 attached to the load beam 34 at a connection point 45, and a slider 37 that is attached to the bonding portion 36A of the flexure 36. The connection point 45 and the bonding portion 36A are illustrated in FIG. 3. The slider 37, flexure 36, load beam 34, and mount plate 35 are assembled in the head gimbal assembly (HGA), which is mounted on the frame of the HDD unit at the pivoting point 33.

Figure 3A:
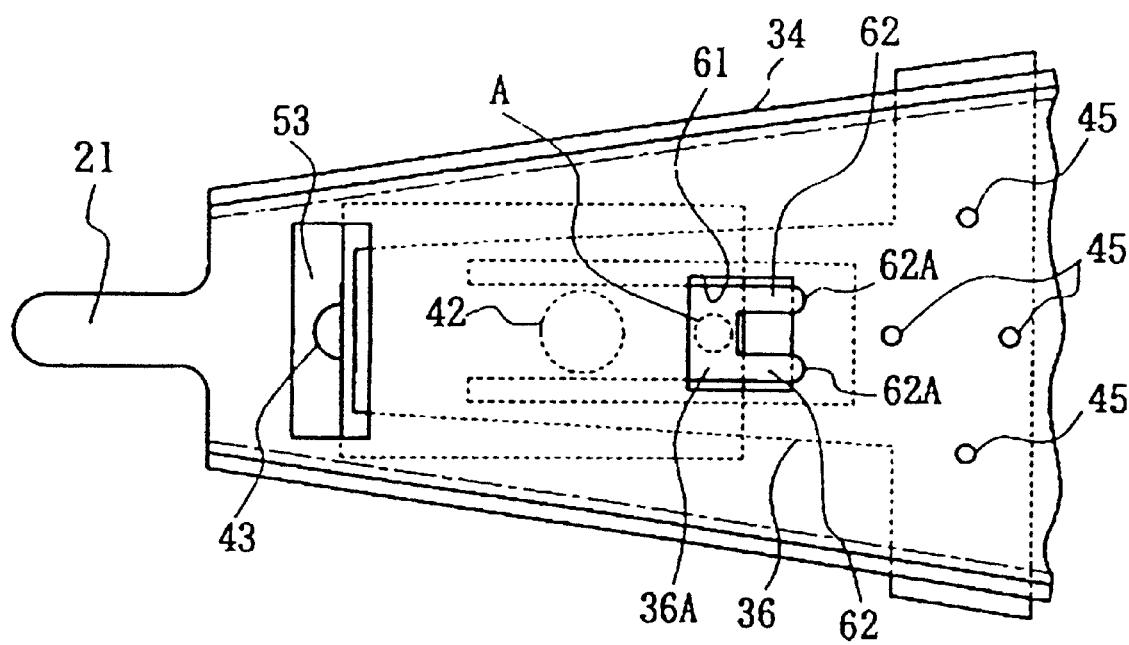
FIGS. 3(a) and 3(b) are top and side views of an embodiment of a load beam, a flexure, and a slider assembled in the head supporting arm of the present invention.
Figure 3B:
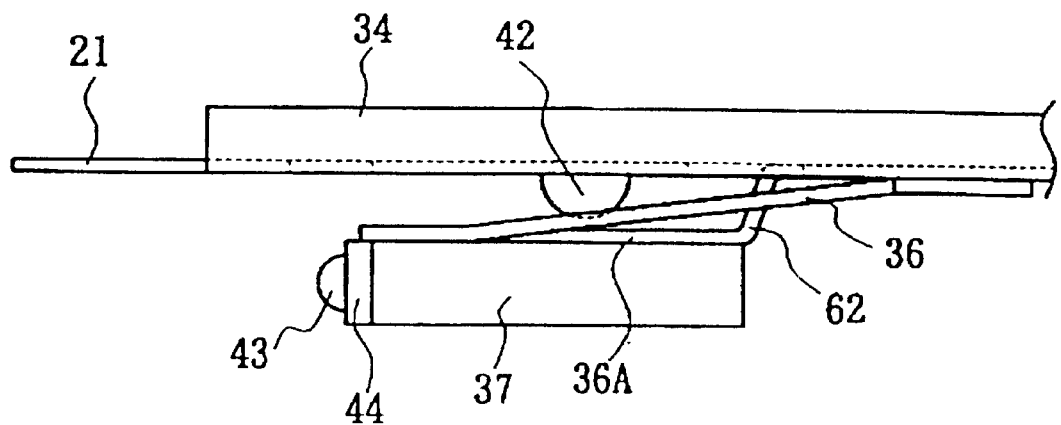

The connection between the load beam 34, flexure 36, and slider 37 of the head supporting arm 31 is illustrated in FIGS. 3(a) and 3(b), which are the top and side view respectively. As shown in FIGS. 3(a) and 3(b), a read/write head 43, which may be an MR head or a GMR head, is mounted on a thin film 44 that is attached to the tip of the slider 37. A dimple 42 that protrudes from the load beam 34 as shown in FIG. 3(b) contacts the bonding portion 36A of the flexure 36. The bonding portion 36A supports the slider 37 and the read/write head 43 and provides support for their gimbal motion.

Referring to FIG. 2(a), An opening 51 is formed in load beam 34 so as to enable the load beam 34 to bend at the pivoting point 52. In addition, load beam 34 includes opening 53, which is used to guide connection wires from the head 43 to the opposite side of the load beam 34.

The most conspicuous feature of the head supporting arm 31 of the present invention is the formation of an exposure opening 61. The exposure opening 61 provides the means to expose the bonding portion 36A of the flexure 36 that bonds to one end of the head assembly. The exposure opening 61 further allows for a pair of limiters 62 that are formed unitarily with the flexure 36 to extend through and hook to the load beam 34 at their tips. The formation of the exposure opening 61 enables the irradiation of a laser beam on part A of the bonding portion 36A from the top as shown in FIG. 3(a) during laser tacking with the limiters 62 present. The limiters 62 are provided to prevent the excessive sliding or any abnormal movement of the slider 37 during the loading and unloading of the head 43 by using the opening 61 which is provided for laser tack without providing any other dedicated opening.

In the above embodiment, the exposure opening 61 is formed almost like a square with a width that is larger than the width of the bonding portion 36A of the flexure 36. As mentioned above, the exposure opening 61 is used to extend the two limiters 62 provided at both ends of the bonding portion 36A of the flexure 36 to the other side of the load beam 34. It should be noted that the width of the opening 61 conforms to the way that the limiters 62 are formed to allow them to pass through. For example, if only one limiter 62 is formed in the center of the bonding portion 36A, the opening 61 would be provided to facilitate the passing of the limiter 62 while allowing for the irradiation of the laser beam during laser tacking process. It also must be noted that the shape of the exposure opening 61 is not necessarily limited only to the shape of a square.

The tip 62A of each limiter 62 is formed so as to be hooked on one side of the exposure opening 61, which is away from the dimple 42. However, tips 62A could also be hooked to the side of the exposure opening 61.

To manufacture the head supporting arm 31 configured as described above, at first the slider 37 is attached to the bonding portion 36A of the flexure 36 via a thermosetting resin while the limiters 62 of the flexure 36 is hooked to the load beam 34. Then, a laser beam is irradiated on part of the bonding portion 36A from which the flexure 36 is exposed through the exposure opening 61, thereby causing a limited curing of the thermosetting adhesive with the heat generated by the laser beam. This enables the temporary attachment of the slider 37 to the flexure 36. Thereafter, the head supporting arm 31 to which both flexure 36 and slider 37 are fixed temporarily is heated in an oven so as to further cure the thermosetting adhesive. The flexure 36 and the slider 37 can thus be fixed adhesively. The most important point in the method for manufacturing the head supporting arm 31 of the present invention is that opening 61 enables the laser tacking while allowing the limiters 62 to be hooked to the load beam 34. By providing the means to hook the limiters 62 to the load beam 34, the present invention allows for joining the flexure 36 and the slider 37 together prior to the irradiation of the laser beam, thus enabling the present invention to take advantage of the limiters during the laser tacking process. According to the manufacturing method described above, therefore, it is possible to manufacture the head supporting arm 31 having both merging lip 21 and limiters 62 for loading/unloading at a high yield.

ADVANTAGES OF THE INVENTION

As described above clearly, according to the present invention, the exposure opening used for temporarily fixing an adhesive made of a thermosetting resin for bonding the flexure and the slider together can also be used as an opening for extending the limiters during the loading and unloading process. It is thus possible to irradiate a laser beam used for laser tacking to the head suspension arm having both the merging lips and the limiters for loading/unloading. In addition, because the laser beam irradiation point is away from sensitive elements, such as the GMR head, those elements can be protected. Consequently, the head supporting arm can be formed in a simple and compact configuration.

What is claimed is:

1. A head supporting arm, comprising:

a load beam, said load beam having an exposure aperture;

a flexure including a connecting portion connected to said load beam on one surface and a bonding portion;

a slider having a head on its one end and bonded to said bonding portion by an adhesive agent at the other end; and a limiter formed unitarily with the flexure, wherein said exposure aperture exposes the bonding portion of said flexure and enables the extension of the limiter through the opening to engage a surface of the load beam opposite to the surface that the flexure extends from.

2. The head supporting arm of claim 1, wherein said exposure opening is shaped almost squarely with a width wider than the bonding portion of said flexure.

3. The head supporting arm of claim 1, wherein said limiter is hooked on a side of said exposure aperture that is farther from a dimple.

4. The head supporting arm of claim 1, wherein the limiter and the exposure aperture are specifically configured to expose the bonding portion of said flexure to irradiation.

5. A data recording apparatus, including:

a data recording medium for recording data; and a head supporting arm that moves relatively to said data recording medium; said head supporting arm includes;

a load beam, said load beam having a dimple for generating a gimbal motion between a flexure and a slider and an exposure opening for exposing a bonding portion of said flexure at an end opposite where a head of said slider is provided;

a flexure connected to said load beam, the flexure including a connecting portion and a bonding portion;

a slider having a head on one end and bonded to said bonding portion by an adhesive agent; and a limiter formed unitarily with said flexure, wherein said exposure opening enables extension of the limiter through the opening for hooking to a surface of the load beam opposite to a surface of the load beam from which the flexure extends.

* * * * *

UNITED STATES PATENT AND TRADEMARK OFFICE
CERTIFICATE OF CORRECTION

PATENT NO. : 6,556,384 B1  Page 1 of 1
DATED : April 29, 2003
INVENTOR(S) : Inoue et al.

It is certified that error appears in the above-identified patent and that said Letters Patent is hereby corrected as shown below:

Column 1,
Line 38, "agents cause" should read -- agent causes --.
Line 39, "cured when" should read -- cured. When --.
Line 41, "at thermosetting resin" should read -- at the thermosetting resin --.
Line 42, "on for" should read -- for --.
Line 61, "are" should read -- as have been --.
Line 63, "these type of" should read -- these types of --.

Column 2,
Line 16, "supporting that" should read -- supporting arm that --.
Line 55, "with length of" should read -- with the lengths of --.
Line 64, "At first" should read -- first --.

Column 3,
Line 49, "of the" should read -- of --.
Line 59, "arm 31, is" should read -- arm 31 is --.
Line 60, "disk 10 thereby" should read -- disk 10. Thereby --.

Column 4,
Line 21, "An opening" should read -- an opening --.
Line 40, "laser tack" should read -- laser tacking --.
Line 53, "during" should read -- during the --.

Signed and Sealed this

Twelfth Day of August, 2003

JAMES E. ROGAN
*Director of the United States Patent and Trademark Office*